US011536664B2

(12) United States Patent
Awada et al.

(10) Patent No.: US 11,536,664 B2
(45) Date of Patent: Dec. 27, 2022

(54) METHOD FOR DETECTING A BIOMOLECULE BY SURFACE-ENHANCED RAMAN SPECTROSCOPY

(71) Applicant: KING FAISAL UNIVERSITY, Al-Ahsa (SA)

(72) Inventors: Chawki Awada, Al-Ahsa (SA); Mohammed Ba Abdullah, Al-Ahsa (SA)

(73) Assignee: KING FAISAL UNIVERSITY, Al-Ahsa (SA)

( * ) Notice: Subject to any disclaimer, the term of this patent is extended or adjusted under 35 U.S.C. 154(b) by 0 days.

(21) Appl. No.: 17/705,325

(22) Filed: Mar. 27, 2022

(65) Prior Publication Data

US 2022/0317047 A1 Oct. 6, 2022

Related U.S. Application Data

(60) Provisional application No. 63/169,177, filed on Mar. 31, 2021.

(51) Int. Cl.
  *G01J 3/44* (2006.01)
  *G01N 21/65* (2006.01)

(52) U.S. Cl.
  CPC . *G01N 21/658* (2013.01); *G01N 2201/06113* (2013.01)

(58) Field of Classification Search
  CPC .................... G01J 3/44; G01N 21/658; G01N 2201/06113; A61B 5/0075
  See application file for complete search history.

(56) References Cited

U.S. PATENT DOCUMENTS

| 7,738,096 B2 | 6/2010 | Zhao et al. |
| 9,329,176 B2 | 5/2016 | Wang et al. |
| 10,338,078 B2 | 7/2019 | Sodeoka et al. |
| 2009/0298197 A1 | 12/2009 | Natan et al. |
| 2010/0114514 A1* | 5/2010 | Wang ..................... G01N 21/65 977/734 |
| 2017/0074799 A1* | 3/2017 | Peterman ............... G01N 33/18 |
| 2017/0358163 A1* | 12/2017 | Clara .................... G01N 21/658 |

FOREIGN PATENT DOCUMENTS

| CN | 110628597 A | 12/2019 |
| CN | 110628599 A | 12/2019 |

OTHER PUBLICATIONS

Cialla, Dana, et al. "SERS-based detection of biomolecules." Nanophotonics 3.6 (2014): 383-411.

* cited by examiner

*Primary Examiner* — Abdullahi Nur
(74) *Attorney, Agent, or Firm* — Nath, Goldberg & Meyer; Richard C. Litman

(57) ABSTRACT

The method for detecting a biomolecule by surface-enhanced Raman spectroscopy is a spectroscopic method of detecting a virus in a biological sample. A target substrate is prepared by depositing nanoparticles of a metal on a substrate of silicon nanowires. The nanoparticles may be gold, silver or a combination thereof. The far-field Raman spectra of at least one biomolecule associated with the virus are obtained. The biological fluid sample to be tested is then applied on the target substrate, and the surface-enhanced Raman spectroscopy spectra of the biological fluid sample on the target substrate are obtained. The far-field Raman spectra of the at least one biomolecule are compared against the surface-enhanced Raman spectroscopy spectra of the biological fluid sample on the target substrate.

8 Claims, 10 Drawing Sheets

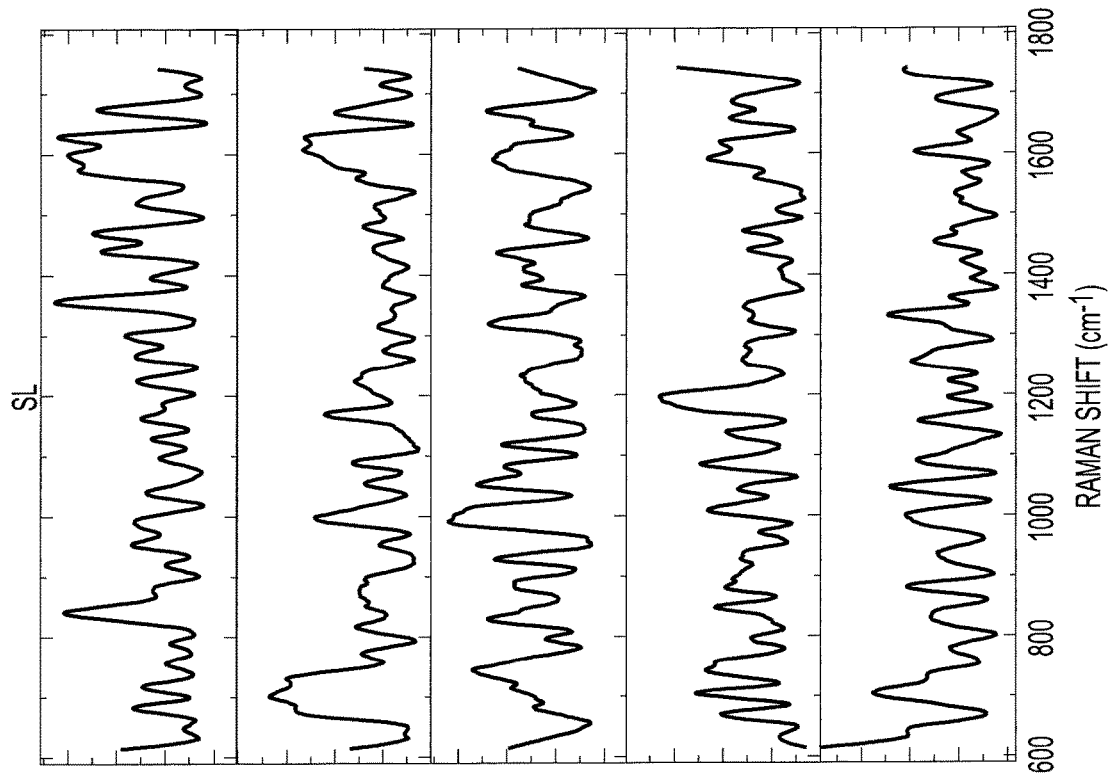
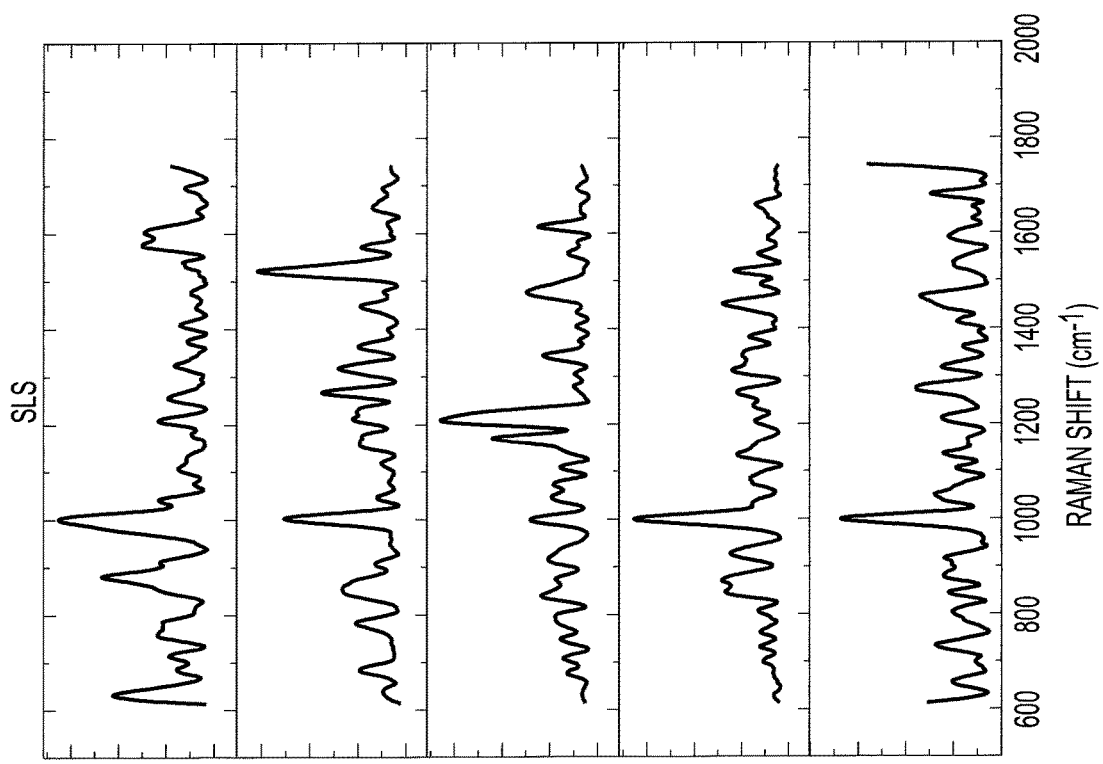
FIG. 4A
FIG. 4B

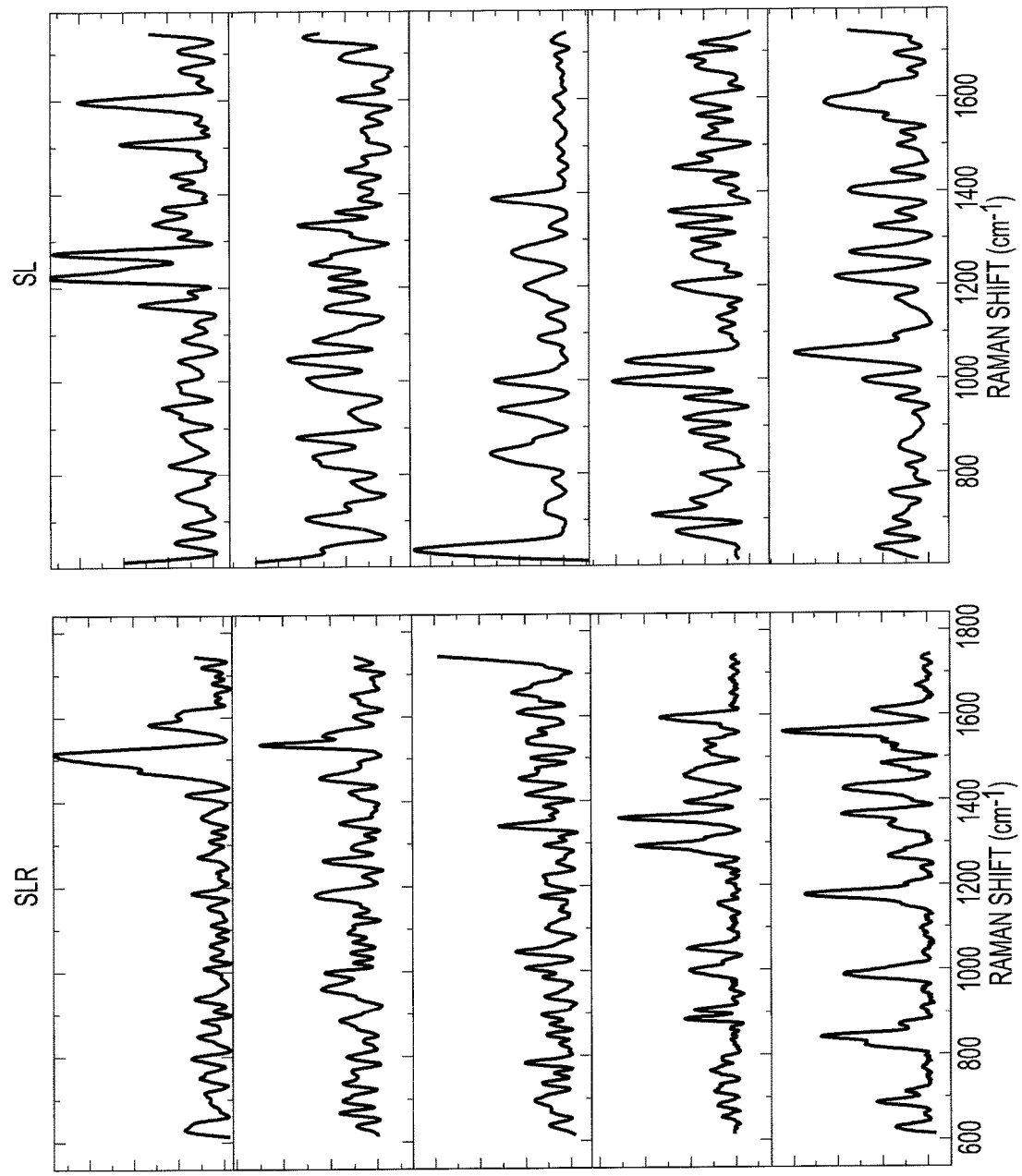

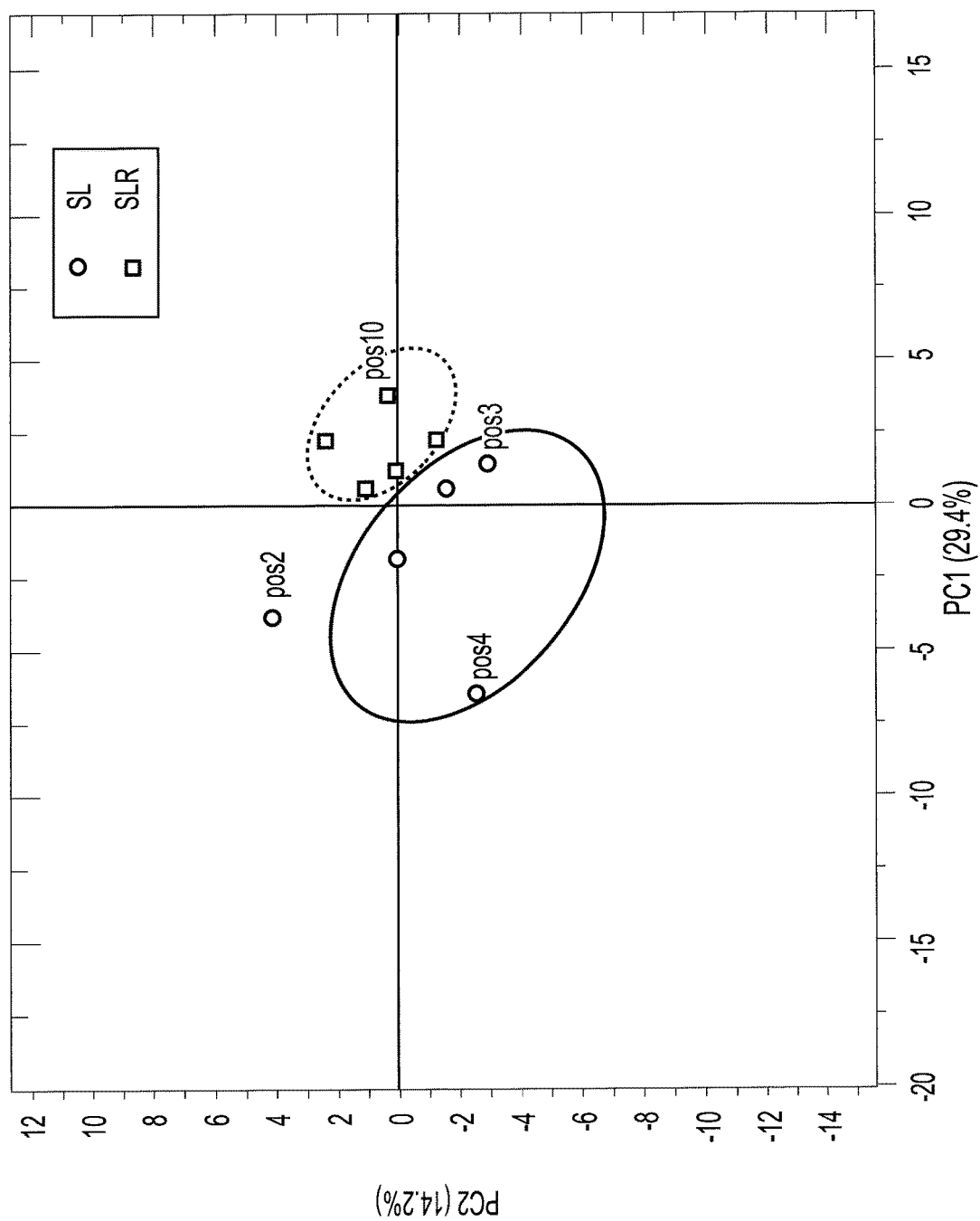

METHOD FOR DETECTING A BIOMOLECULE BY SURFACE-ENHANCED RAMAN SPECTROSCOPY

CROSS-REFERENCE TO RELATED APPLICATION

This application claims the benefit of U.S. Provisional Patent Application No. 63/169,177, filed on Mar. 31, 2021.

BACKGROUND

1. Field

The disclosure of the present patent application relates to the detection of biomarkers in biological samples, and particularly to a method of detecting one or more particular biomolecules, such as the SARS-CoV-2 Spik (S) protein and/or SARS-CoV-2 ribosomal binding protein (RBD), using surface-enhanced Raman spectroscopy.

2. Description of the Related Art

Severe acute respiratory syndrome coronavirus 2 (SARS-CoV-2) is the coronavirus that causes coronavirus disease 2019 (COVID-19), the respiratory illness responsible for the COVID-19 pandemic. The primary test used to diagnose infection with SARS-CoV-2 is the polymerase chain reaction (PCR) test, which amplifies small segments of DNA. PCR testing, however, begins with the collection of a swab sample, taken by a healthcare worker, which is then delivered to a laboratory, where the actual PCR testing is performed. The PCR testing can take anywhere between 24 hours to a few days, thus making it undesirable when results are required quickly.

Although rapid at-home tests for SARS-CoV-2 exist, many of the existing tests suffer from large percentages of both false positive and false negative results. These tests are typically antigen tests, focused on detecting a specific protein associated with SARS-CoV-2. Although popular due to their at-home usage and their rapid test results, their general lack of reliability makes them a poor substitute for the PCR test. The PCR test, however, as noted above, requires sample collection by a healthcare professional and a time-consuming detection process in a specialized laboratory. Thus, a method for detecting a biomolecule by surface-enhanced Raman spectroscopy solving the aforementioned problems is desired.

SUMMARY

A method for detecting a biomolecule by surface-enhanced Raman spectroscopy (SERS) is a spectroscopic method that can be used to detect a virus in a biological sample via the fingerprint of its biomolecules. As a non-limiting example, surface-enhanced Raman spectroscopy may be used to detect SARS-CoV-2 in a saliva sample. The method can include applying a biological sample on a target substrate including silicon nanowires coated with metal nanoparticles, obtaining a SERS spectra of the biological sample on the target substrate, and determining a presence or absence of the biomolecule based on the SERS spectra. The target substrate can be prepared using electroless etching and sputtering. The nanoparticles may be gold, silver or a combination thereof.

For purposes of comparison, the far-field Raman spectra of at least one biomolecule of interest can be obtained. For the non-limiting example of detecting SARS-CoV-2, the at least one biomolecule can be selected from SARS-CoV-2 spike glycoprotein and SARS-CoV-2 ribosomal binding protein.

The biological fluid sample to be tested can be applied on the target substrate, and the SERS spectra of the biological fluid sample on the target substrate can be obtained. As a non-limiting example, a Raman spectrometer having a laser operated at 633 nm with a power ranging between 30 $\mu$W and 50 $\mu$W in multiple positions can be used. The far-field Raman spectra of the at least one biomolecule can be compared against the SERS spectra of the biological fluid sample on the target substrate. A presence of the biomolecule in the biological fluid sample can be determined if the Raman bands associated with the biomolecule are found in the SERS spectra of the biological fluid sample.

These and other features of the present subject matter will become readily apparent upon further review of the following specification.

BRIEF DESCRIPTION OF THE DRAWINGS

FIG. 4A shows surface-enhanced Raman spectroscopy (SERS) spectra of a saliva sample containing the SARS-CoV-2 spike glycoprotein.

FIG. 4B shows SERS spectra of a control sample of pure saliva.

FIG. 6A shows surface-enhanced Raman spectroscopy (SERS) spectra of a saliva sample containing the SARS-CoV-2 ribosomal binding protein.

FIG. 6B shows SERS spectra of a control sample of pure saliva.

FIG. 7 shows the results of a principal component analysis (PCA) on the spectra of FIGS. 6A and 6B.

Similar reference characters denote corresponding features consistently throughout the attached drawings.

DETAILED DESCRIPTION OF THE PREFERRED EMBODIMENTS

A method for detecting a biomolecule by surface-enhanced Raman spectroscopy is a spectroscopic method of detecting a biomolecule in a biological sample. As a non-limiting example, the method for detecting a biomolecule by surface-enhanced Raman spectroscopy may be used to detect SARS-CoV-2 in a saliva sample. The method can include applying a biological sample on a target substrate including silicon nanowires coated with metal nanoparticles, obtaining a SERS spectra of the biological sample on the target substrate, and determining a presence or absence of the biomolecule based on the SERS spectra. The target substrate can be prepared by depositing nanoparticles of a metal on a substrate of silicon nanowires. The nanoparticles may be gold, silver or a combination thereof. Once the SERS spectra of the biological fluid sample on the target substrate is obtained, a presence of the biomolecule in the biological fluid sample can be determined if the Raman bands associated with the biomolecule are found in the SERS spectra of the biological fluid sample.

In experiment a target substrate was prepared by cleaning a p-doped silicon substrate with a resistivity of 7 Ω·cm with acetone, ethanol and deionized water. The cleaned p-doped silicon substrate was then rinsed in piranha solution (70 wt % $H_2SO_4$ and 30 wt % $H_2O_2$), and then rinsed again in deionized water. The cleaned and rinsed p-doped silicon substrate was then immersed in an aqueous solution of hydrofluoric acid and silver nitrate (2 M/0.02 M) for 20 minutes to produce an etched substrate of silicon nanowires. The etched substrate was cleaned with hydrochloric acid and nitric acid in order to remove silver dendrites therefrom. Metal nanoparticles were then deposited on the etched substrate using a DC magnetron sputtering system (an Orion 3-UHV sputtering system manufactured by AJA International, Inc. of North Scituate, Mass.) at 10 millitorr, 120 W, and ambient temperature. Silver nanoparticles were deposited over 120 seconds of sputtering, and gold nanoparticles were deposited over 30 seconds of sputtering. For the sputtering of the nanoparticles, gold and silver targets were obtained from Labtech International Ltd. of the United Kingdom. During sputtering, the distance between the sample and the target was maintained at 15 cm. The sample was rotated azimuthally in order to homogeneously disperse the nanoparticles. The particle deposition was directed along a direction normal to the surface of the substrate.

Figure 1B:
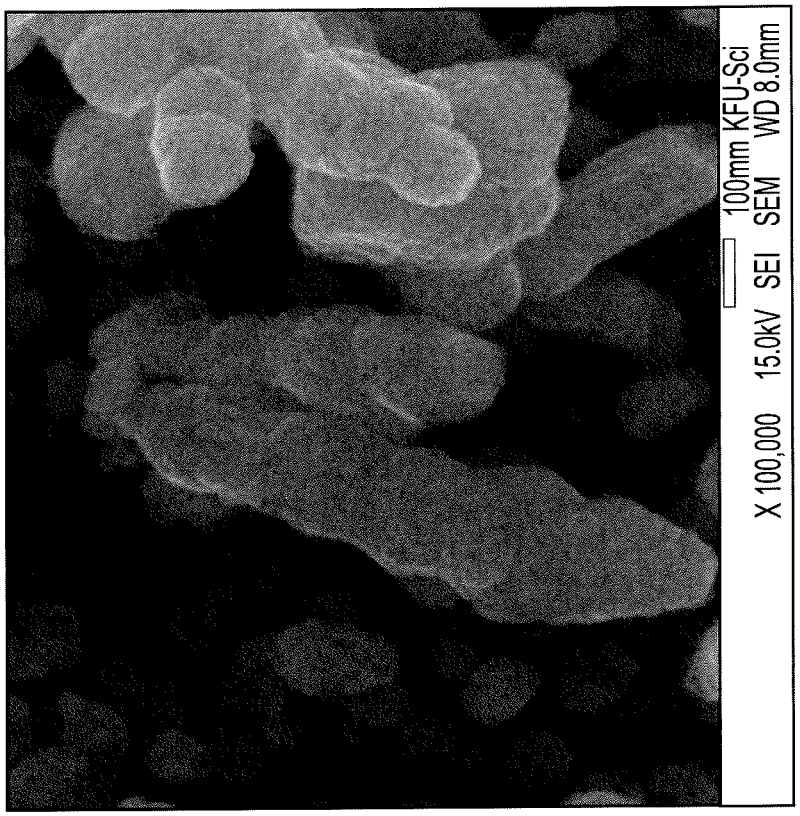
FIG. 1B is a SEM micrograph of the surface film of the target substrate of FIG. 1A, shown at a magnification of 100,000×.
Figure 1A:
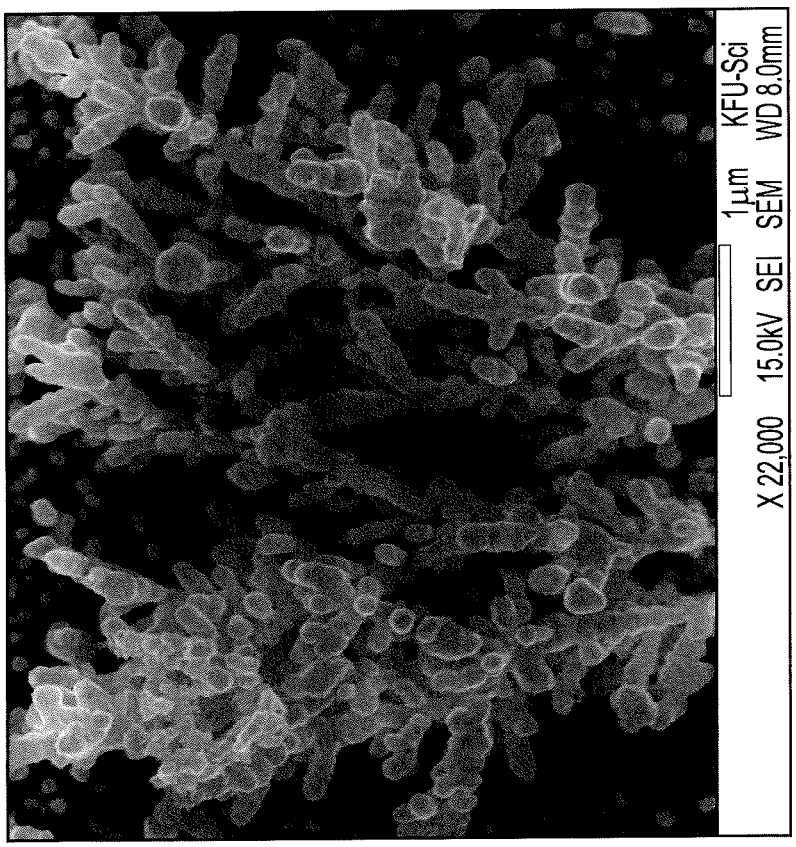
FIG. 1A is a scanning electron microscope (SEM) micrograph of a surface film of a target substrate prepared according to a method for detecting a biomolecule by surface-enhanced Raman spectroscopy, with the micrograph shown at a magnification of 20,000×.
Figure 2A:
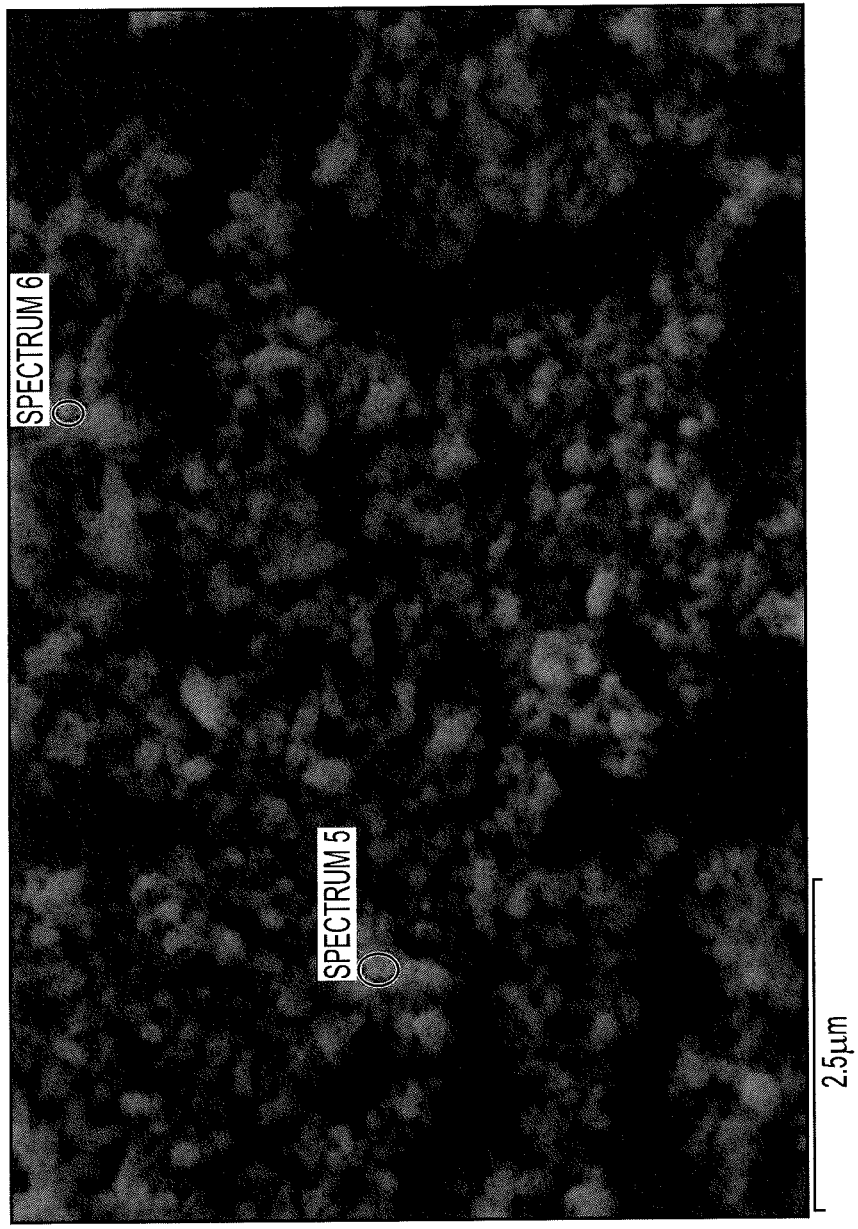
FIG. 2A is a SEM micrograph of the surface film of the target substrate of FIG. 1A, with two different locations marked for performance of energy-dispersive X-ray spectroscopy (EDX).
Figure 2B:
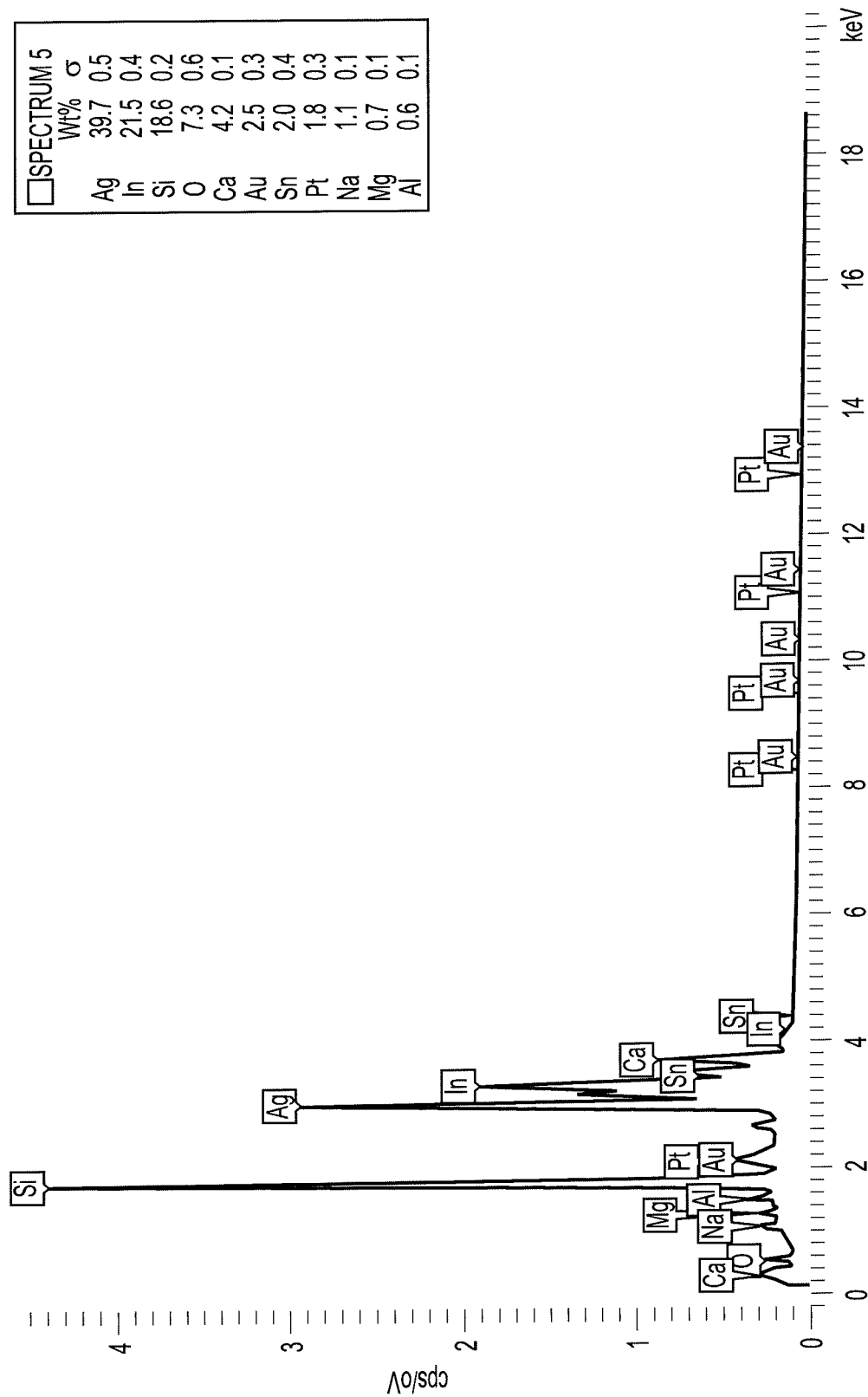
FIG. 2B and FIG. 2C respectively show the EDX spectra at the two different locations indicated in FIG. 2A.
Figure 2C:
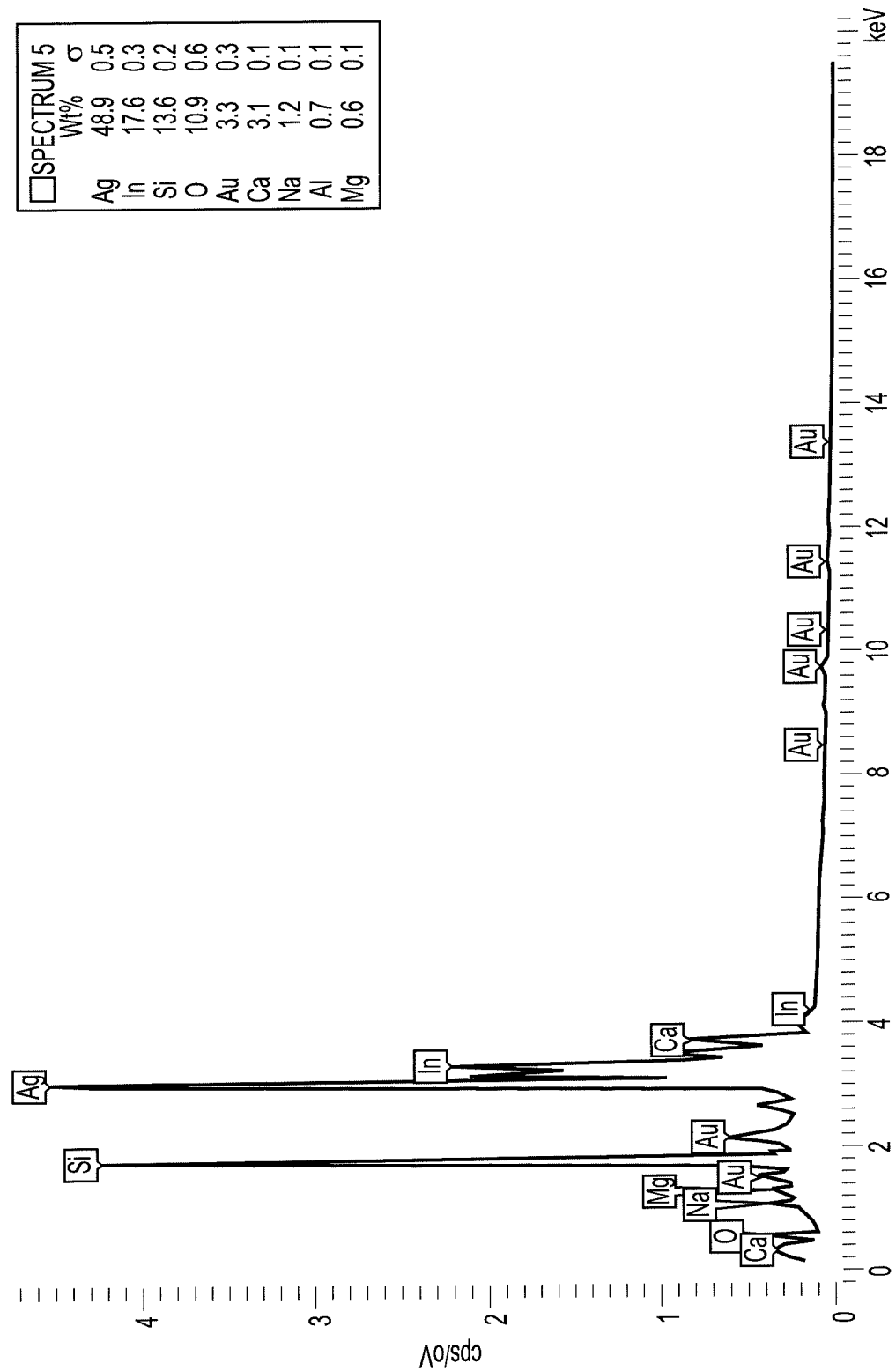

In order to obtain morphological micrographs of the metal nanoparticle films on the substrates, a JCM-7000 NeoScope scanning electron microscope (SEM), manufactured by Jeol® Ltd. of Japan, was used. FIGS. 1A and 1B show the morphological micrographs of the films at a scan voltage of 15.0 kV. FIGS. 1A and 1B show the substrate coated with both gold and silver nanoparticles, with FIG. 1A showing a magnification of 20,000× and FIG. 1B showing a magnification of 100,000×. FIGS. 1A and 1B clearly show the presence of nanorods covered with silver and gold nanoparticles. Additionally, energy-dispersive X-ray spectroscopy (EDX) was used to analyze the samples, with the resultant spectra taken on different positions. The annotated rings in FIG. 2A show the two different locations on the surface where EDX was performed. FIGS. 2B and 2C show the resultant EDX spectra at the two different locations, respectively, confirming the presence of silicon, silver and gold. It can be seen that there is more silver than gold, which is expected due to the sputtering time used for each metal.

For purposes of comparison, the far-field Raman spectra of at least one biomolecule of interest, e.g., a biomolecule associated with a virus to be detected, can be obtained. For the non-limiting example of detecting SARS-CoV-2, the far-field Raman spectra of the SARS-CoV-2 spike glycoprotein or the far-field Raman spectra of the SARS-CoV-2 ribosomal binding protein may be obtained.

The biological fluid sample to be tested can be applied on the target substrate, and the SERS spectra of the biological fluid sample on the target substrate can be obtained. As a non-limiting example, the SERS spectra may be obtained using a Raman spectrometer having a laser operated at 633 nm with a power ranging between 30 µW and 50 µW in multiple positions. In experiments, Raman spectra were collected using a LabRAM® HR800, manufactured by Horiba® Ltd. of Japan. The Raman spectra were collected in a backscattering geometry with a spectral resolution of 0.9 $cm^{-1}$ at ambient temperature. A He—Ne Laser with $\lambda$=632.8 nm, an objective 50×, and a power level of 50-100 µW were employed. The lower power was chosen in order to prevent any photo-induced effects.

The far-field Raman spectra of the at least one biomolecule can be compared against the SERS spectra of the biological fluid sample on the target substrate. A presence of the biomolecule in the biological fluid sample can be determined if the Raman bands associated with the at least one biomolecule are found in the SERS spectra of the biological fluid sample.

In experiments with SARS-CoV-2, SARS-CoV-2 spike glycoprotein (hereinafter referred to as the "S" protein) and SARS-CoV-2 ribosomal binding protein (hereinafter referred to as the "RBD" protein) were obtained from Sino Biological Ltd. Co. of China (catalog numbers 40589-V08B1 and 40592-V08B, respectively) in lyophilized form. The stock was reconstituted by adding sterile water (400 µL) to the vial to prepare a 0.25 mg/mL stock solution. Saliva was collected from SARS-CoV-2 negative people (with written consent). RBD protein was added to the saliva sample to a final concentration of 10M. The final concentration was chosen based on reported viral loads in biofluids.

Figure 3A:
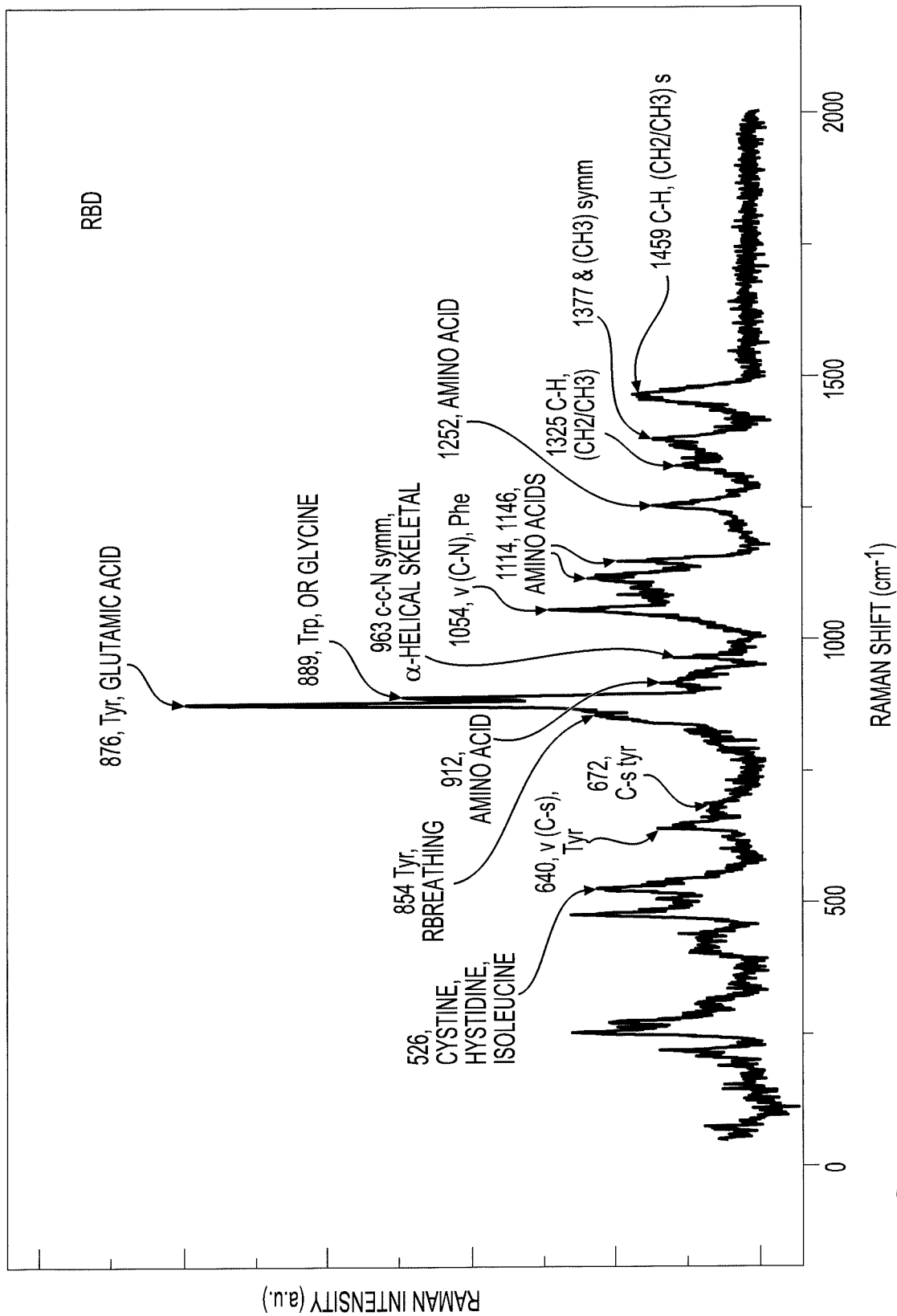
FIG. 3A shows the far-field Raman spectra of the SARS-CoV-2 spike glycoprotein.
Figure 3B:
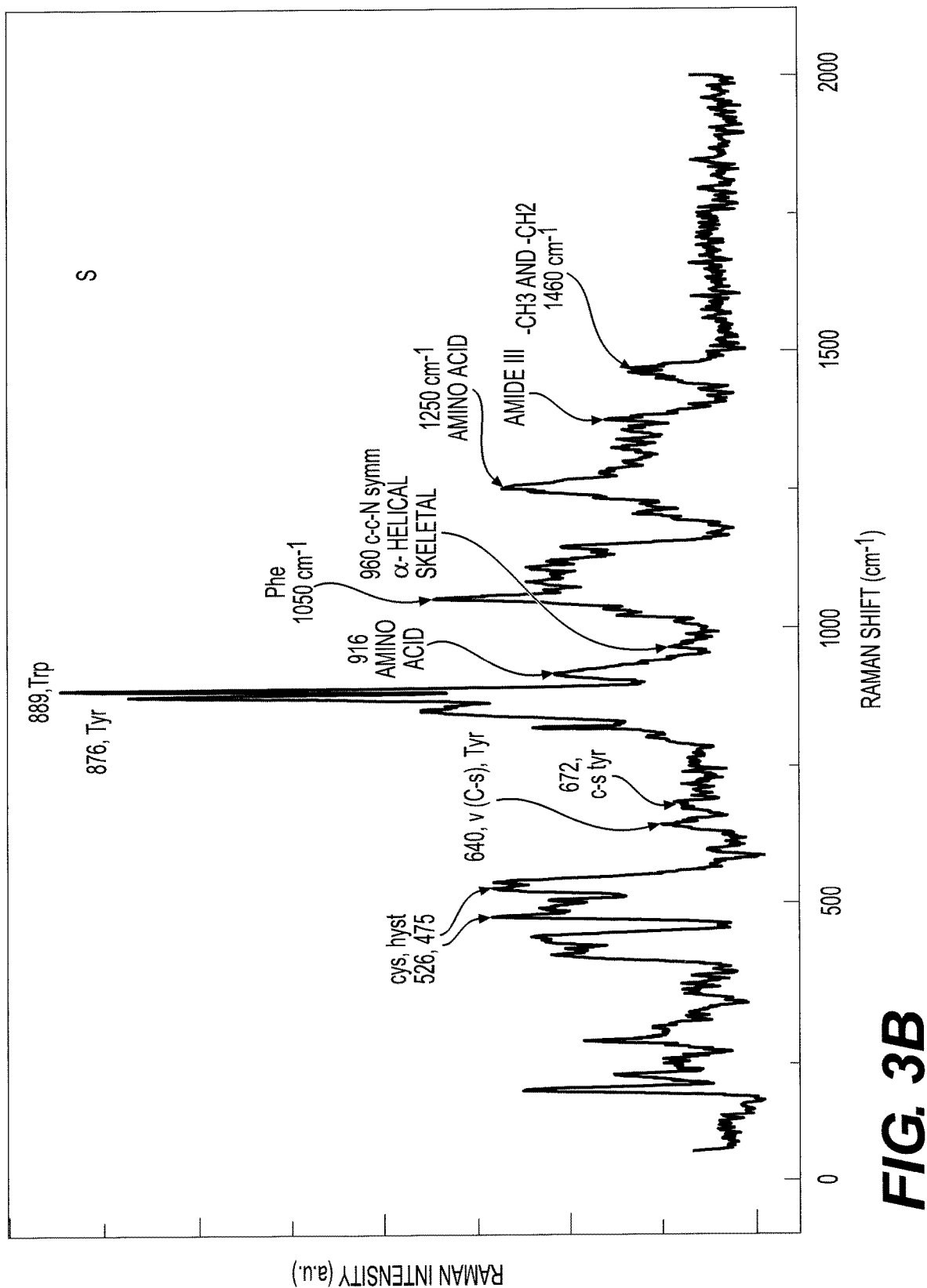
FIG. 3B shows the far-field Raman spectra of the SARS-CoV-2 ribosomal binding protein.

In order to obtain the far-field Raman spectra of the S protein and the RBD protein, 10 µL of each, with concentrations of $10^{-5}$ M, were respectively dropped on commercial gold substrates. Using a 633 nm laser wavelength, an objective of 50×, a 0.5 power density, and a duration of 150 seconds, the far-field Raman spectra of each protein was measured. FIGS. 3A and 3B respectively show the appearance of different Raman bands assigned to amino acids corresponding to the S protein and the RBD protein. Comparing the spectra, there are clear similarities between the spectra for the S protein and the RBD protein, though more bands can be seen in FIG. 3A. This result is expected because the S protein is much larger and contains more amino acids and other elements.

In both spectra, Raman bands located at 1460 $cm^{-1}$, 1370 $cm^{-1}$, 1250 $cm^{-1}$, 1054 $cm^{-1}$, 960 $cm^{-1}$, 876 $cm^{-1}$, 640 $cm^{-1}$, and 526 $cm^{-1}$ can be seen, and these bands respectively correspond to —$CH_3$ and —$CH_2$ deformation from the amino acid side chains, amide III from both the in-plane NH group bending vibration and the C—N stretching vibration, phenylalanine, α-helical skeletal (c-c-N symmetry), glutamic and tyrosine acids, and cysteine and histidine acids.

In order to perform surface-enhanced Raman spectroscopy (SERS) on the saliva samples, 1.5 µL of the S protein immersed in human saliva (hereinafter referred to as the "SL-S" sample) and a control saliva sample without the S protein (hereinafter referred to as the "SL" sample") were respectively dropped on target substrates prepared as described above. After 20 minutes of drying, the SERS spectra were measured at different positions. FIGS. 4A and 4B show different spectra at 5 positions for each of the SL-S and SL samples, respectively, where the SERS spectra were measured for 3 seconds per spectrum.

Figure 5:
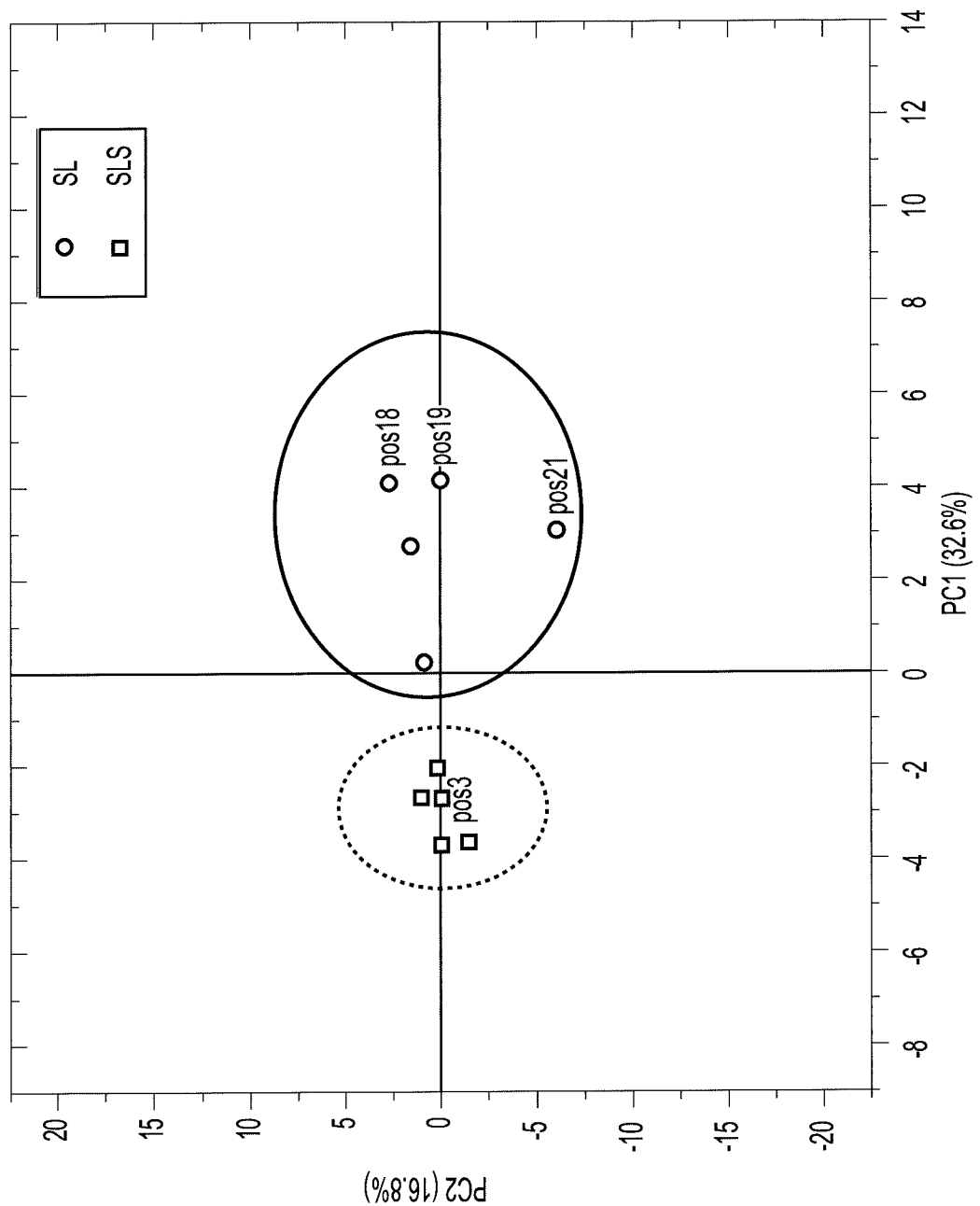
FIG. 5 shows the results of a principal component analysis (PCA) on the spectra of FIGS. 4A and 4B.

Each set of spectra had a good signal-to-noise ratio (SNR), particularly for the short integration time of 3 seconds and at very low power. In order to verify the reproducibility of the SERS method, a multivariate analysis on the SERS spectra was performed using principal component analysis (PCA), as shown in FIG. 5. Pre-treatment processing, including smoothing, background subtraction and normalization, were performed before the statistical studies. The PCA analysis shows how the S protein is identified from the control (SL). The S protein had a concentration of $10^{-9}$ M, and it should be noted that the control saliva (SL) did not undergo any purification or centrifugation to remove debris. It can be seen from the statistical study that the samples containing the S protein are very close, however, those containing just SL are more distant.

Additionally, 1.5 µL of RBD protein immersed in saliva (hereinafter referred to as "SL-R") and one control saliva sample (SL) without RBD protein were each dropped on respective target substrates. After 20 minutes drying, the SERS spectra were measured at different positions. FIGS. 6A and 6B show different spectra at 5 positions for each of the SL-R and SL samples, respectively. The presence signal can be seen in the spectra. For a short integration time of 3 seconds and at a very low power, the Raman spectra from the SL and SL-R samples were easily collected. In order to verify the reproducibility of the SERS method, a multivariate analysis on the SERS spectra was performed using principal component analysis (PCA), and these results are shown in FIG. 7. Pretreatment processing, including smoothing, background subtraction and normalization, was performed before the statistical studies. It can be seen in the PCA analysis how the RBD protein is identified from the control (SL). A concentration of $10^{-9}$ M of RBD was used in the study. When comparing against the usage of the S and RBD proteins for identification of SARS-CoV-2, the present analysis indicates that identification using the S protein can be more accurate.

It is to be understood that the method for detecting a biomolecule by surface-enhanced Raman spectroscopy is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A method for detecting a biomolecule by surface-enhanced Raman spectroscopy, comprising the steps of:
    preparing a target substrate by depositing nanoparticles of a metal on a substrate of silicon nanowires, wherein the metal is selected from the group consisting of silver, gold, and a combination thereof;
    obtaining far-field Raman spectra of the biomolecule;
    applying a biological fluid sample on the target substrate;
    obtaining surface-enhanced Raman spectroscopy spectra of the biological fluid sample on the target substrate;
    comparing the far-field Raman spectra of the biomolecule against the surface-enhanced Raman spectroscopy spectra of the biological fluid sample on the target substrate;
    determining a presence of the biomolecule in the biological fluid sample if the Raman bands associated with the biomolecule are found in the surface-enhanced Raman spectroscopy spectra of the biological fluid sample, wherein the step of preparing the target substrate comprises the steps of:
    cleaning a p-doped silicon substrate;
    rinsing the cleaned p-doped silicon substrate in piranha solution;
    rinsing the cleaned p-doped silicon substrate in deionized water;
    immersing the cleaned and rinsed p-doped silicon substrate in an aqueous solution of hydrofluoric acid and silver nitrate to produce an etched substrate comprising silicon nanowires;
    removing silver dendrites from the etched substrate; and
    depositing the nanoparticles of the metal on the etched substrate using the magnetron sputtering.

2. The method for detecting a biomolecule by surface-enhanced Raman spectroscopy as recited in claim 1, wherein the step of obtaining the surface-enhanced Raman spectroscopy spectra of the biological fluid sample on the target substrate comprises using a Raman spectrometer having a laser operated at 633 nm with a power between 30 µW and 50 µW in multiple positions.

3. The method for detecting a biomolecule by surface-enhanced Raman spectroscopy as recited in claim 1, wherein the biomolecule comprises SARS-CoV-2 spike glycoprotein.

4. The method for detecting a biomolecule by surface-enhanced Raman spectroscopy as recited in claim 1, wherein the biomolecule comprises SARS-CoV-2 ribosomal binding protein.

5. A method for detecting SARS-CoV-2 by surface-enhanced Raman spectroscopy, comprising the steps of:
    preparing a target substrate by depositing nanoparticles of a metal on a substrate of silicon nanowires, wherein the metal is selected from the group consisting of silver, gold, and a combination thereof;
    obtaining far-field Raman spectra of at least one biomolecule associated with SARS-CoV-2;
    applying a biological fluid sample on the target substrate;
    obtaining surface-enhanced Raman spectroscopy spectra of the biological fluid sample on the target substrate;
    comparing the far-field Raman spectra of the biomolecule against the surface-enhanced Raman spectroscopy spectra of the biological fluid sample on the target substrate; and
    determining a presence of the SARS-CoV-2 in the biological fluid sample when the Raman bands associated with the at least one biomolecule are found in the surface-enhanced Raman spectroscopy spectra of the biological fluid sampler, wherein step of preparing the target substrate comprises the steps of:
    cleaning a p-doped silicon substrate;
    rinsing the cleaned p-doped silicon substrate in piranha solution;
    rinsing the cleaned p-doped silicon substrate in deionized water;
    immersing the cleaned and rinsed p-doped silicon substrate in an aqueous solution of hydrofluoric acid and silver nitrate to produce an etched substrate comprising silicon nanowires;
    removing silver dendrites from the etched substrate; and
    depositing the nanoparticles of the metal on the etched substrate using the magnetron sputtering.

6. The method for detecting SARS-CoV-2 by surface-enhanced Raman spectroscopy as recited in claim 5, wherein the step of obtaining the surface-enhanced Raman spectroscopy spectra of the biological fluid sample on the target substrate comprises using a Raman spectrometer having a laser operated at 633 nm with a power between 30 µW and 50 µW in multiple positions.

7. The method for detecting SARS-CoV-2 by surface-enhanced Raman spectroscopy as recited in claim 5, wherein the at least one biomolecule comprises SARS-CoV-2 spike glycoprotein.

8. The method for detecting SARS-CoV-2 by surface-enhanced Raman spectroscopy as recited in claim 5, wherein the at least one biomolecule comprises SARS-CoV-2 ribosomal binding protein.

* * * * *